United States Patent [19]

Takabayashi

[11] Patent Number: 4,677,037
[45] Date of Patent: Jun. 30, 1987

[54] FUEL CELL POWER SUPPLY
[75] Inventor: Yasuhiro Takabayashi, Kanagawa, Japan
[73] Assignee: Fuji Electric Company, Ltd., Kanagawa, Japan
[21] Appl. No.: 889,122
[22] Filed: Jul. 24, 1986
[30] Foreign Application Priority Data Jul. 25, 1985 [JP] Japan .................................. 60-164502
Aug. 6, 1985 [JP] Japan .................................. 60-172883

[51] Int. Cl.⁴ .......................................... H01M 8/04
[52] U.S. Cl. ........................................... 429/9; 429/23
[58] Field of Search ................... 429/9, 23, 22

[56] References Cited
U.S. PATENT DOCUMENTS

3,432,356  3/1969  Christianson ......................... 429/22
3,915,747 10/1975  Summers et al. ..................... 429/23
4,000,003 12/1976  Baker et al. .......................... 429/9
4,098,959  7/1978  Fanciullo .............................. 429/23

Primary Examiner—Donald L. Walton
Attorney, Agent, or Firm—Finnegan, Henderson Farabow Garrett & Dunner

[57] ABSTRACT

A fuel cell power supply including a fuel cell and a secondary cell comprises a fuel cell current detector for detecting the fuel cell current generated by the fuel cell; a load current detector for detecting a load current flowing through the load of the fuel cell power supply and for producing a load signal corresponding to the load current; a setting device for producing a set signal corresponding to the strength and time variation pattern of the output signal; and a control device for receiving the output signal and the set signal and for controlling the strength of the fuel cell current.

3 Claims, 4 Drawing Figures

FUEL CELL POWER SUPPLY

BACKGROUND OF THE INVENTION

This invention relates generally to a fuel cell power supply, and particularly to a fuel cell and a secondary cell connected in parallel to the fuel cell for supplying power to a load while charging and employing the secondary cell as a floating cell. The secondary cell makes up for a deficiency in power supplied by the fuel cell at start up or the peak load. More specifically, this invention relates to a system configuration wherein the output voltage of a fuel cell and the performance of a secondary cell are prevented from decreasing even when an overload condition suddenly intermittently takes place.

When a motor as a load connected to a fuel cell is started, a strong starting load current flows, thus causing sharp fuel consumption across the fuel cell electrodes. Since fuel supply to the electrodes normally takes place, however, the output voltage of the fuel cell is lowered because of the fuel shortage. In the case of hydrogen-oxygen battery system using a fuel quality changer, an unreacted excessive gas or off-gas contained in the fuel hydrogen formed in the quality changer and introduced to the fuel cell electrodes is recycled to the quality changer and used as part of the fuel for an evaporator heating burner. As a consequence, if the consumption of the fuel hydrogen is sharply increased, as mentioned above, the burner will fail to fire because of the off-gas shortage.

In a power supply using fuel cell, a secondary cell is connected in parallel to the fuel cell and used as a floating cell for making up a deficiency in power when the fuel cell fails to bear the full load. In such a power supply including the above described fuel and secondary cells, however, the secondary cell selected is normally equivalent in capacity to the fuel cell, because the former is made to bear an overload over the rated current. For this reason, the secondary cell must be made larger in size.

It is therefore an object of the invention to provide a fuel cell power supply free from reduction in the output voltage of the fuel cell. It is a further object of the invention to prevent fires in an off-gas combustion burner from failing to fire because of an off gas shortage. Another object of the invention is to prevent deterioration in the performance of a secondary cell or damage thereto even when an overload current exceeding the rated output current of the fuel cell is intermittently produced in the load current at short time intervals.

It is another object of the present invention to reduce the capacitance of a secondary cell in a fuel cell power supply, and to make the secondary cell more compact.

SUMMARY OF THE INVENTION

The present invention solves the problems inherent in the above-described conventional fuel cell power supply by providing fuel cell power supply comprising a fuel cell and a secondary cell for backing up the fuel cell. According to the first embodiment of the present invention, the fuel cell power supply comprises fuel cell current detecting means for detecting the fuel cell current generated by the fuel cell, load current detecting means for detecting a load current flowing through the load of the fuel cell power supply and for producing a signal corresponding to the load current, setting means for producing a signal corresponding to the strength and time variation pattern of the output signal of the load current detecting means, and control means for receiving the output signal of the fuel cell current detecting means and the set signal of the setting means and controlling the strength of the fuel cell current with the set signal as a set value. In the fuel cell power supply thus arranged, the fuel cell current is caused by the above-described means to become overcurrent, exceeding the rated output current in such a state that the overcurrent exceeding the rated output current of the fuel cell is produced in the load current at long intervals. By allowing the overcurrent to have a value corresponding to the time interval at which the overload current is generated, the fuel cell is forced to output the overcurrent therefrom. Thus, it becomes possible to utilize a secondary cell having a capacity smaller than that of a conventional fuel cell power supply in which the secondary cell must bear the full overcurrent.

In the second embodiment of the present invention, the fuel cell power supply further comprises fuel cell current detecting means for detecting the fuel cell current generated by the fuel cell, load current detecting means for detecting a load current flowing through the load of the fuel cell power supply and for producing a detection signal corresponding to the load current, setting means for receiving the detection signal, producing a first set signal free from variation with time when the value of the detection signal does not exceed a fixed value and producing the combination of the first set signal and a second set signal proportional to the value of the first detection signal and added to the first set signal for a duration corresponding to the value of the first detection signal when the first detection signal exceeds the fixed value, and control means for receiving the output signal of the fuel cell current detecting means and the set signal of the setting means and controlling the strength of the fuel cell current with the output signal of the setting means as a set value. In the fuel cell power supply thus arranged, the fuel cell is forced by the control means to output a fixed quantity of electricity in an overcurrent state when the load current exceeding the rated current becomes the overcurrent and it becomes possible to utilize a secondary cell having a capacity smaller than that provided in the case of a conventional fuel cell power supply in which a secondary cell must bear the full overcurrent.

BRIEF DESCRIPTION OF THE DRAWINGS

The accompanying drawings, which constitute a part of the specification, illustrate embodiments of the invention, and, together with the description, serve to explain the principles of the invention. Of the drawings.

DETAILED DESCRIPTION OF THE INVENTION

Reference will now be made in detail to the present preferred embodiments of the invention, examples of which are illustrated in the accompanying drawings.

Figure 1:
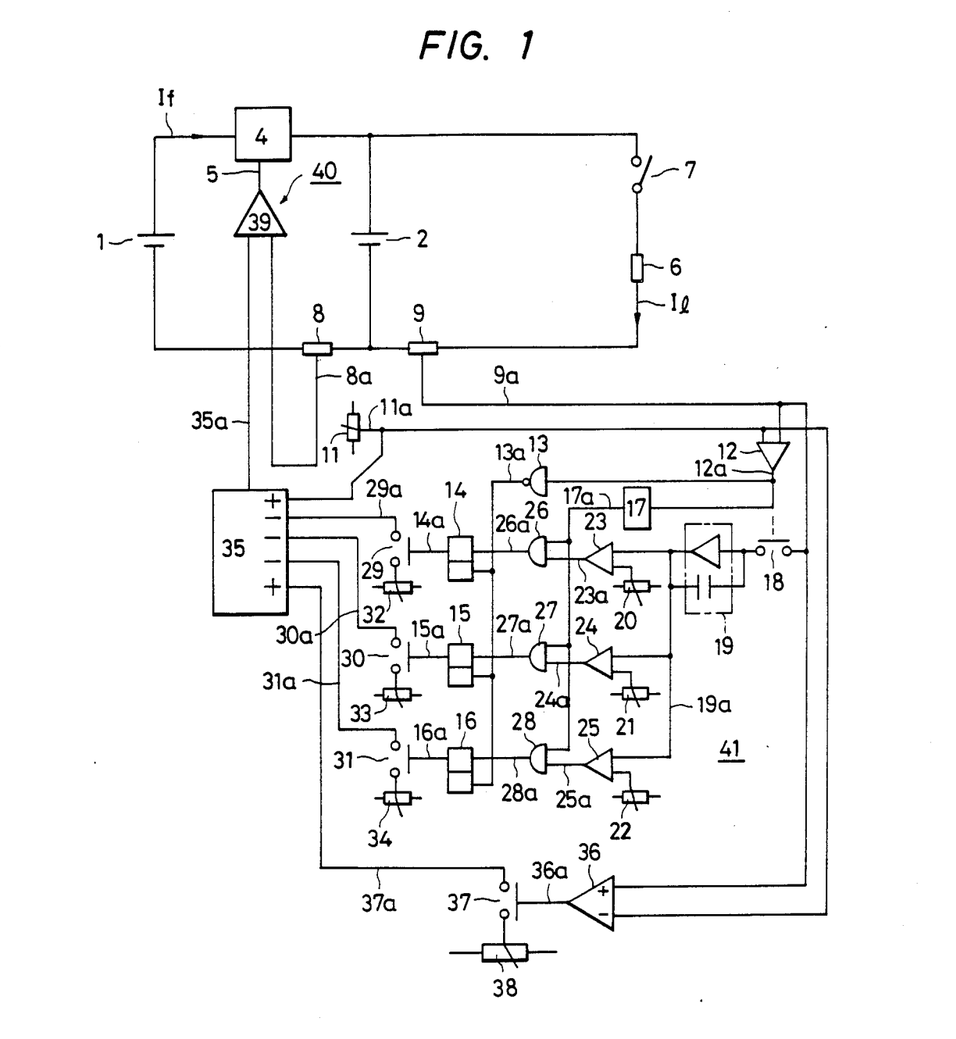
FIG. 1 is a block diagram of an embodiment of the present invention.

FIG. 1 is a block diagram of an embodiment of the present invention comprising a fuel cell 1 and a secondary cell 2 connected in parallel with the fuel cell 1 and used to make up for a deficiency in the current If generated by the fuel cell 1. A D.C. converter 4 receives a deviating signal 5 and allows for the cell current If according to the signal 5. A load 6 such as a motor is driven by the fuel cell 1 and the secondary cell 2. A load switch 7 is provided for connecting the load 6 to the cells 1 and 2 or separating the load therefrom, the converter 4 being designed to convert the output voltage of 30 V received from the fuel cell 1 into a D.C. voltage of roughly 100 V, given that the rated output voltages of the cells 1 and 2 are 30 and 100 V, respectively. A fuel cell current detector 8 detects the fuel cell current If and produces a voltage signal 8a proportional to the strength of the current If. A load current detector 9 is for detecting the load current Il flowing through the load 6 and for producing a voltage signal 9a proportional to the strength of the current Il. A voltage generator 11 produces a signal 11a having a voltage Vr corresponding to the rated current Ir of the fuel cell current If. Comparator 12 receives signals 9a, 11a and produces a binary signal 12a whose level becomes H when the signal 9a becomes greater than the signal 11a. An inverter 13 is provided for receiving the signal 12a and producing a signal 13a for resetting flip flops 14, 15, 16, the output signals 14a, 15a, 16a of the flip flops 14, 15, 16 being reset at a level L when the level of the signal 13a rises from L to H. A monostable circuit 17 receives the signal 12a and produces one pulse of short duration leveled at H as an output signal 17a, when the level of the signal 12 rises from L to H. A switch 18 is driven by the signal 12a and closed when the signal 12a is set at level H, so as to apply the signal 9a to an integrator 19. Voltage setters 20, 21, 22 generate respective voltages $V_1$, $V_2$, $V_3$ set on the basis of the output voltage 19a of the integrator 19, the voltages $V_1$, $V_2$, $V_3$ being boosted in the above order. A comparator 23 receives the signal 19a and the voltage $V_1$ and produces a signal 23a whose level becomes H when the signal 19a exceeds the voltage $V_1$. A comparator 24 is provided for receiving the signal 19a and the voltage $V_2$ and producing a signal 24a whose level becomes H when the signal 19a exceeds the voltage $V_2$. Similarly, a comparator 25 receives the signal 19a and the voltage $V_3$ and produces a signal 25a whose level becomes H when the signal 19a exceeds the voltage $V_3$. Each of said AND circuits 26, 27, 28, receives a double input, namely, the pulse signal 17a commonly supplied to them as a first input and the respective signals 23a, 24a, 25a as a second input, the output signals 26a, 27a, 28a of the AND circuits 26, 27, 28 being respectively supplied to the flip flops 14, 15, 16, and the output signals 14a, 15a, 16a of the flip flops 14, 15, 16 being so arranged as to be set at the level H when the signals 26a, 27a, 28a are set at the level H while the output signals 14a, 15a, 16a are set at level L, respectively. Switches 29, 30, 31 are driven by the output signals 14a, 15a, 16a of the flip flops and are closed when these output signals are set at level H, respectively. Voltage generators 32, 33, 34 generate voltages $V_{C1}$, $V_{C2}$, $V_{C3}$ respectively, the switches 29~31 being used to apply to an adder-subtracter 35 the output voltages $V_{C1}$~$V_{C2}$ of the corresponding voltage generators 32~34 in their ON state as signals 29a, 30a, 31a, the voltages $V_{C1}$, $V_{C2}$, $V_{C3}$ being those corresponding to the currents $I_{C1}$, $I_{C2}$, $I_{C3}$ in the fuel cell current If.

The above configuration also includes a comparator 36 for receiving the output voltage signal 11a of the voltage generator 11 and the output voltage signal 9a of the load current detector 9 and for producing a binary signal 36a at level H when the signal 9a becomes greater than the signal 11a. A switch 37 is driven by the output signal 36a and is closed when the signal is set at level H. A voltage generator 38 generates a voltage Vco corresponding to a current Ico in the fuel cell current If, the switch 37 and the voltage generator 38 being connected in such a manner that the output voltage Vco of the generator 38 is produced as the output signal 37a of the switch 37 when the switch 37 is closed. The adder-subtracter 35 is so constructed as to receive the signals 11a, 29a, 30a, 31a, 37a and produce a signal 35a having a voltage Vs corresponding to the results of operations by adding and subtracting $(11a+37A)-(29a+30a+31a)$ regarding the signals received. A deviating amplifier 39 is so arranged as to receive the signal 35 and the output signal 8a of the fuel cell current detector and produce the deviating signal 5 corresponding to the difference between both signals. The D.C. converter 4 is used to adjust the fuel cell current If in such a manner as to reduce the deviating signal 5 to zero.

Figure 2:
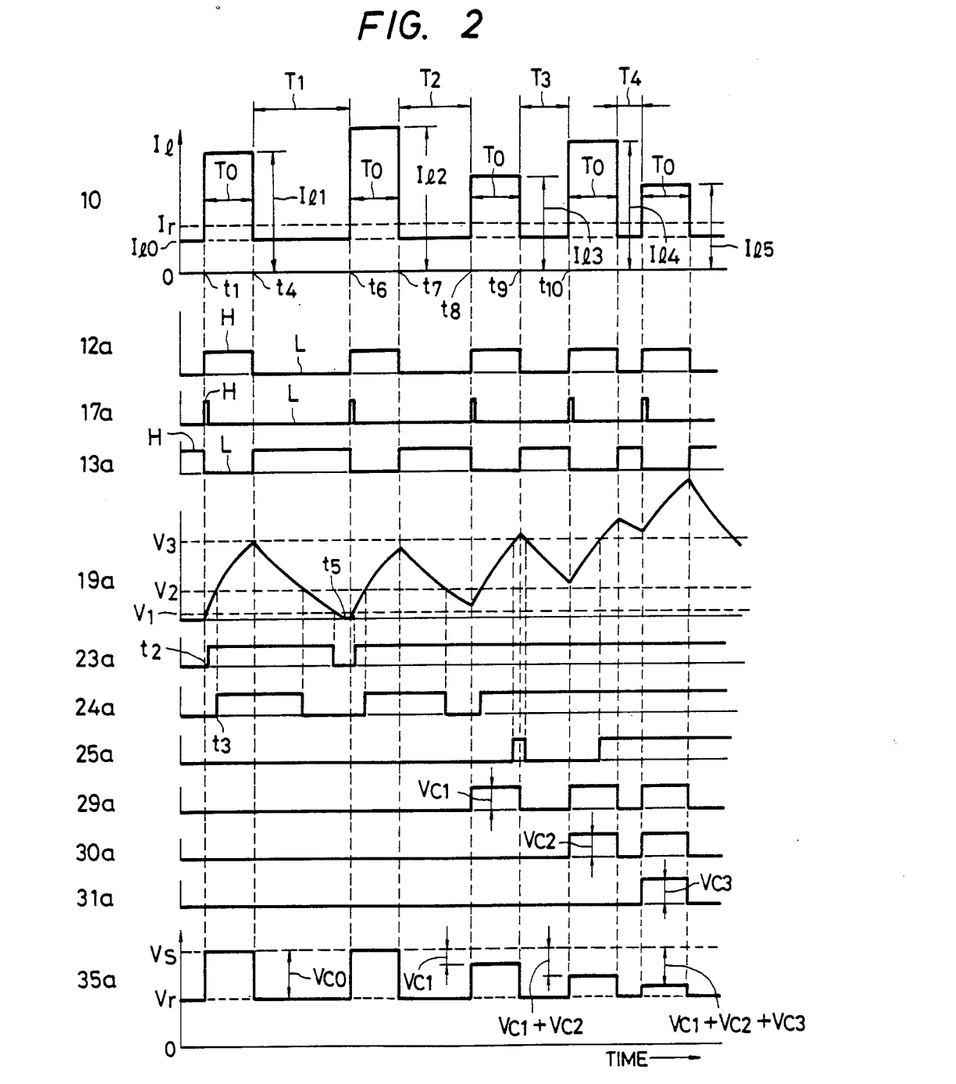
FIG. 2 is a waveform chart illustrating waveforms in the principal portions of the power supply of FIG. 1.

Simultaneously referring to a waveform chart of FIG. 2 illustrating the waveforms in the principal portions, the operation of the fuel cell power supply of FIG. 1 will subsequently be described. Supposing that the load current $I_1$ is kept at $I_{1\,0}$, which is smaller than the rated output current Ir of the fuel cell 1 up to time $t_1$, all switches 18, 29~31, 37 are opened, since the output signal 12a of the comparator is set at level L and consequently the voltage Vs of the output signal 35a of the adder-subtracter becomes equal to the voltage Vr corresponding to the rated output current Ir of the fuel cell 1 as the signal 11a is applied thereto. Accordingly, the fuel cell current If is controlled by the deviating amplifier 39 and the D.C. converter 4 so that the fuel cell current If may conform to the rated current Ir. In other words, the secondary cell 2 is charged with a current equivalent to $Ir-I_1$ in strength up to time $t_1$. A control means 40 consists of the deviating amplifier 39 and the D.C. converter 4, and is used to control the fuel cell current If so that the current If may have a value corresponding to that of the signal 35a with the signals 8a, 35a as set values. The voltage generator 11 is designed to reduce the voltage of the output signal 11a successively as the voltage of the secondary cell 11a is brought close to an allowable upper limit.

Assume that the load current $I_1$ is changed into a rectangular wave of duration $T_0$ with a current $I_{1\,1}$ greater than the current Ir. Since output signal 12a of the comparator is then set at level H at time $t_1$, the output signal 13a of the inverter is set at the level L and one pulse is generated by the monostable circuit 17. The switch 18 is closed at that time and the level of the output signal 19a of the integrator is caused to start rising as a feedback capacitor is charged. Moreover, the output 36a of the comparator is also set at level H, and consequently, the signal 37a at the voltage Vco is supplied by the switch 37 to the adder-subtracter 35. Since all switches 29~31 are opened at this point in time, the voltage of the output signal 35a of the adder-subtracter becomes $Vr+Vco$. As a result, the fuel cell current If is so controlled by the control means 40 as to have the value $Ir+Vco$. Although the voltage Vco is set in conformity with $Ico=Ir$, the voltage of the signal 37a is allowed to be set at a value other than Vco and, since the fuel cell current If is sufficient to cover the load current $I_l$ up to $I_{l\,1}<(Ir+Ico)$, in that case, no current is discharged from the secondary cell 2. If $I_{l\,1}>(Ir+Ico)$, current will be discharged from the secondary cell 2. However, the discharge current is obviously smaller than that in the case where the fuel cell current 3 is so controlled as to remain at Ir even when the load current Il becomes $I_{l\,1}$.

When the level of the signal 19a exceeds the voltage $V_1$ set by the voltage setter 20 at time $t_2$, the output signal of the comparator is set at level H. Notwithstanding, he output signal 26a of the AND circuit is allowed to remain at level L since the signal 17a has already been set at level L. Although the output signal 24a of the comparator is also set at level H when the level of the signal 19a exceeds the voltage $V_2$ set by the voltage setter 21 at time $t_3$, the output signal 27a of the AND circuit is also caused to remain at level L, since the signal 17a has already been set at level L. The load current Il is restored to $I_{l\,0}$ in strength at time $t_4$, which is a duration of $T_0$ later than time $t_1$ and the levels of the output signals 12a, 36a of the comparators are both returned to L, whereas the switch 18 is opened. In consequence, the voltage of the set signal 35a becomes Vr, and the level of the output signal 19a of the integrator successively drops because of the discharge of the feedback capacitor. The fuel cell current If at time later than time $t_4$ becomes equal to Ir in strength. If the level of the output signal 19a of the integrator drops and successively becomes lower than the levels $V_2$, $V_1$ while the strength of the load current 10 remains at $I_{l\,0}$, the levels of the outputs 24a, 23a of the comparators will gradually return to L at the respective points of time. The level of the signal 19a ultimately becomes zero at time $t_5$.

If the load current Il is again changed into a rectangular wave of duration $T_0$ at a value of $I_{l\,2}$ which is greater than Ir at time $t_6$ later than time $t_5$, the fuel cell current If will become Ir+Ico on and after time $t_6$, as in the preceding case, and the output signals 23a, 24a of the comparators are successively set at level H as the level of the output signal 19a of the integrator rises. When the strength of the load current Il returns to $I_{l\,0}$ at time $t_7$, the voltage of the set signal 35a also returns to Vr and the level of the output signal 19a of the integrator again starts to drop. When the level of the signal 19a becomes lower than $V_2$, the level of the output 24a of the comparator returns to L. If the load current Il is again changed into a rectangular wave of duration $T_0$ at a value of $I_{l\,3}$ which is greater than Ir at time $t_8$ where the level of the signal 19a has not yet reached $V_1$, the flip flop 14 will be set by the signal 17a through the AND circuit 26 since the output signal 23a of the comparator is set at level H when the pulse signal 17a is produced by the monostable circuit 17 at time $t_8$. Consequently, the output signal 14a of the flip flop is set at the level H at time $t_8$ and the signal 29a at the voltage $V_{C1}$ is applied to the adder-subtracter 35. The signal 37a at the voltage Vco has also been applied to the adder-subtracter and the voltage of the set signal 35a becomes $(Vr+Vco-V_{C1})$ at time $t_8$. Therefore, the fuel cell current 3 is so controlled as to conform to the value $(Ir+Ico-I_{C1})$ corresponding to the voltage of the set signal 35a. In comparison with the control of the cell current at (Ir+Ico), the fuel consumption in the fuel cell 1 is thus reducible, and the output voltage of the cell 1 is prevented from decreasing, whereas the possibility of a failure to fire of a burner for off-gas combustion is eliminated.

When the load current is seen to increase suddenly at time $t_8$, the output signals 24a, 25a of the comparators are successively set at H, since the level of the signal 19a ultimately exceeds the output voltage $V_3$ of the voltage setter 23. Notwithstanding, the switches 30, 31 are not closed since the signal 17a remains at level L as in the preceding case. The strength of the load current Il returns to $I_{l\,0}$ at time $t_9$, a duration of $T_0$ later than time $t_8$, and the level of the output signal 13a of the inverter rises to H. Consequently, the flip flop 14 is reset and the voltage of the signal 29a becomes zero. Moreover, since the voltage of the signal 37a also becomes zero then, the voltage of the signal 35a ultimately returns to Vr. The level of the signal 19a starts to drop at time $t_9$ and, when it becomes lower than $V_3$, the level of the output signal 25a of the comparator returns to L. If the load current Il is again changed into a rectangular wave of duration $T_0$ with a value $I_{l\,4}$ which is greater than Ir before the level of the signal 19a reaches $V_2$, the voltage of the set signal 35a will become $(Vr+Vco-V_{C1}-V_{C2})$, since the output signals 23a, 24a of the comparators have been set at level H this time. In other words, the fuel cell current If is so controlled as to remain at $(Ir+Ico-I_{C1}-I_{C2})$ later than time $t_{10}$. The fuel consumption in the cell 1 is less than what is indicated in the preceding case where the load current Il became $I_{l\,3}$. Thus, even if the time interval $T_3$ between time $t_9$ and $t_{10}$ is short, i.e., even if it is attempted to supply an overcurrent stronger than the rated current Ir from the fuel cell 1 and the secondary cell 2 to the load 6 at short time intervals, no reduction in the output voltage of the fuel cell 1 nor failure to fire in the off-gas combustion burner is brought about.

As set forth above, each means in the apparatus of FIG. 1 thus operates and the fuel cell current If is controlled with the output signal 35a of the adder-subtracter 35 as a set value. In other words, the signal 35a functions as a set signal in that case and the means excluding the fuel cell 1, the secondary cell 2, the D.C. converter 4, the load 6, the load switch 7, the detectors 8, 9 and the control means 40 constitute the setting means for producing the set signal 35a corresponding to the strength and time pattern of the output signal 9a of the load current detecting means 9a. As is obvious from the above description, if the time interval at which the overload state is produced, i.e., the intermittent time, is as long as $T_1$ shown in FIG. 2 when the overload state wherein the load current Il in FIG. 1 exceeds Ir is intermittently produced, the fuel cell current If is increased to Ir+Ico and, as the above time interval is successively shortened in the order of $T_2$, $T_3$, $T_4$ as shown in FIG. 2, the strength of the current 3 is caused to become smaller than Ir+Ico according to the time contraction. If the interval at which the overload state is intermittently produced in such a fuel cell power supply is long, the fuel supply to the fuel cell 1 is caused to follow the variation of the load current. Accordingly, at least part of the increased portion of the load current can be covered by an increase of the output current of the fuel cell 1, and the discharge of the secondary cell is suppressed. On the other hand, when the increase of the output current of the fuel cell 1 is suppressed as the interval at which the overload state is intermittently produced is shortened, the secondary cell 2 is caused to bear the increased portion of the load current. Even if the fuel supply to the fuel cell 1 becomes unable to follow up the load variation as the intermittent overload interval is shortened, no reduction in the output voltage of the fuel cell nor failure to fire in the off-gas combustion burner is brought abut.

In the above embodiment, the three signals 29a, 30a, 31a are successively applied to the adder-subtracter for subtraction as the intermittent overload interval is shortened. However, the present invention is not limited to that embodiment, and, needless to say, more than three signals may be applied to the adder-subtracter for this purpose.

According to the above embodiment, the integrator for integrating the load current is provided for the setting means and the charge of the overload current and discharge thereof when the overload is released are utilized. When the intermittent overload occurs for a short time, the output of the fuel cell is so corrected as to decrease. When the above interval is long, the output is not corrected because the fuel is being sufficiently supplied. Under such control, the set signal proportional to the strength and time pattern of the output signal of the load current detecting means is applied to the control means. When the overload current exceeds the rated output current of the fuel cell in the load current for long time intervals, the fuel cell current becomes an overcurrent exceeding the rated output current, and the fuel cell is forced to produce the overcurrent corresponding to the interval at which the overload current is generated to make the secondary cell bear the full load. Thus, a secondary cell having a capacity smaller than what is used in a conventional fuel cell power supply may be used.

Figure 3:
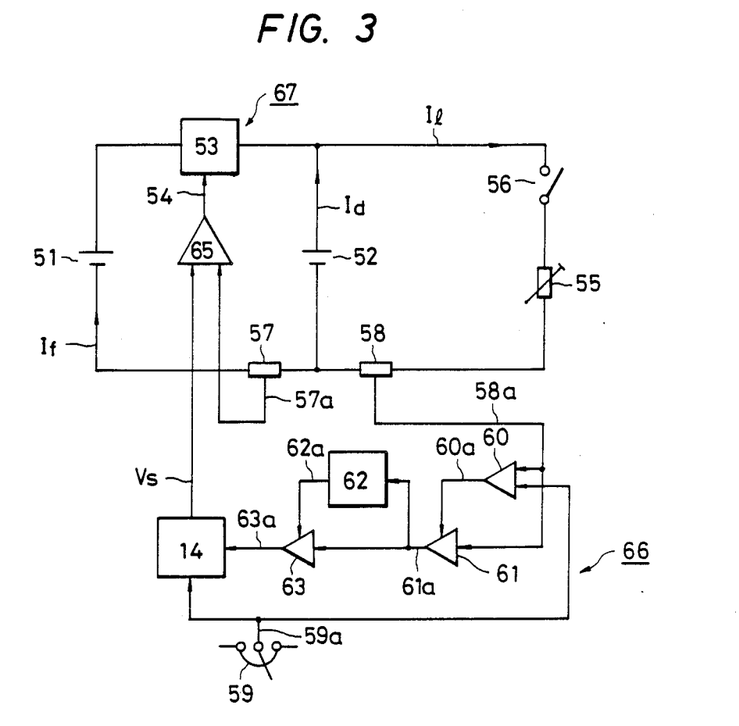
FIG. 3 is a block diagram of another embodiment of the present invention.
Figure 4:
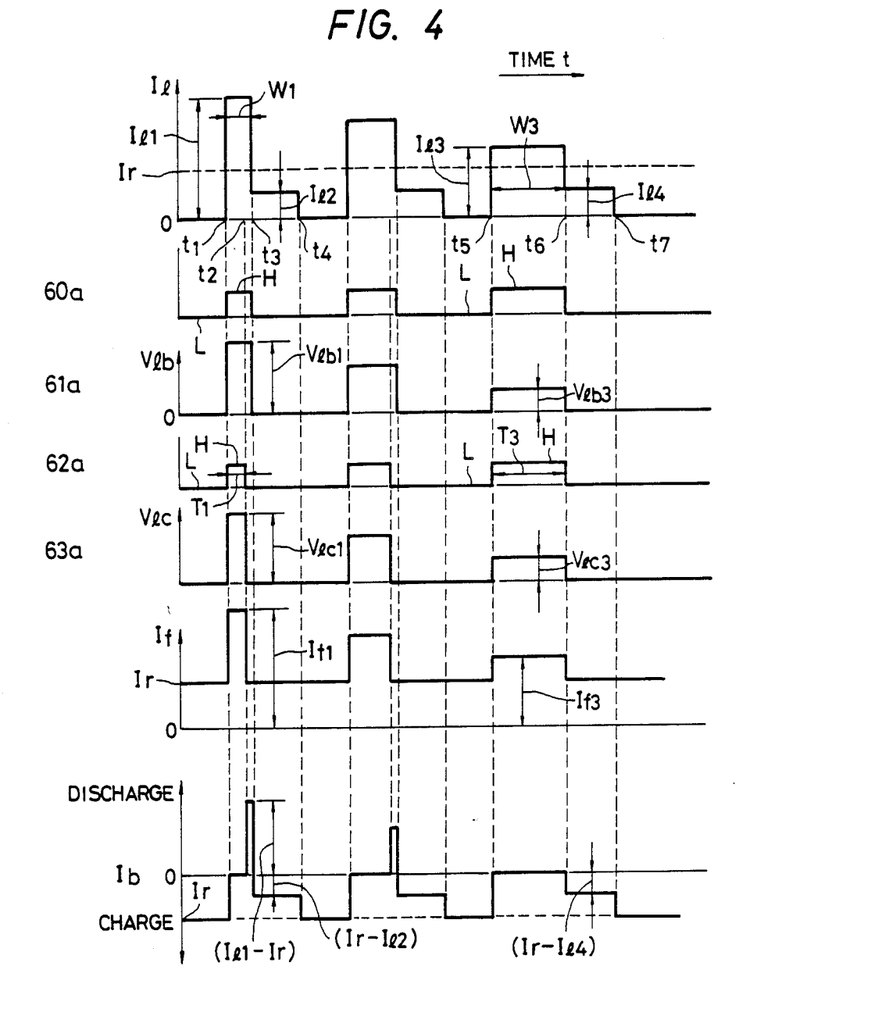
FIG. 4 is a waveform chart illustrating waveforms in the principal portions of the power supply of FIG. 3.

Referring to FIGS. 3, 4, another embodiment of the present invention will be described.

FIG. 3 is a block diagram of another embodiment of the present invention comprising a fuel cell 51; a secondary cell 52 connected in parallel with the fuel cell 51 and used to make up for a deficiency in the current If generated by the fuel cell 51; a D.C. converter 53 for receiving a deviating signal 54 and allowing for the cell current If according to the signal 54; and a load 55 such as a motor driven by the fuel cell 51 and the secondary cell 52. A load switch 56 is provided for connecting the load 55 to the cells 51 and 52 or separating the load therefrom, the converter 53 being designed to convert the output voltage of 30 V received from the fuel cell 51 into a D.C. voltage of roughly 100 V, given that the rated output voltage of the cells 51 and 52 are 30 and 100 V, respectively. A fuel cell current detector 57 detects the fuel cell current If and produces a voltage signal 57a proportional to the strength of the current If. A load current detector 58 detects a load current $I_1$ flowing through the load 55 and produces a detection signal 58a having a voltage $V_1$ a equal to $A.I_1$ with A as a proportionality factor. A voltage generator 59 produces a voltage Vr as a first set signal 59a, the voltage Vri being equal to the voltage of the signal 57a produced by the detector 57 when the fuel cell current If becomes the rated current Ir, and a comparator 60 receives the detection signal 58a and the first set signal 59a and produces a binary signal 60a whose level becomes H when the former becomes greater than the latter.

The embodiment further comprises a first amplifier for receiving the detection signal 58a and the output signal 60a of the comparator 60 and for producing a voltage signal as an output signal 61a. The voltage signal has a value of $V_1 b = B.V_1 a$ with B as a fixed constant when the signal 60a is set at a level H. A time signal generator 62 receives the output signal 61a of the amplifier and applies an equation (1)

$$T = K.(1/V_1 bo) \tag{1}$$

where K=proportionality factor, on the value $V_1$bo of the output signal 61a immediately after the level of the output signal 60a of the comparator rises from L to H, and produces a binary signal 62a whose level becomes H during the time T expressed by the equation (1) after the above rising time. A second amplifier 63 receives the output signal 61a of the amplifier and the output signal 62a of the signal generator and produces a voltage signal as an output signal 63a, the voltage signal having a value of $V_1 c = C.V_1 b$ with C as a fixed constant when the signal 62a is set at the level H. An adder 64 adds the first set signal 69a to the output signal 63a and produces a voltage Vs resulting from the addition as a set voltage. A deviating amplifier 65 receives the output voltage signal 67a of a fuel cell current detector 67 and the set voltage Vs and produces the deviating signal 54 corresponding the difference therebetween, the D.C. converter 53 regulating so that the deviating signal 54 becomes zero. A setting means 66 is provided comprising the voltage generator 59, the comparator 60, the amplifiers 61, 63, the time signal generator 62 and the adder 64. The setting means 66 thus arranged causes the adder 64 to produce the first set signal 59a without variation with time as the set voltage Vs, on receiving the detection signal 58a when the value $V_1 2$ of the detection signal 58a does not exceed the fixed voltage Vr adding to the first set signal 59a. The signal 63a having the strength $V_1$ c proportional to the value of the detection signal 58a by the duration T corresponding to the value of the detection signal 58a just when the value $V_1$ a of the detection signal 58a exceeds the fixed voltage Vr and allowing the adder 64 to produce the voltage ($V_1c + Vr$) resulting from the addition as the set voltage Vs. Control means are provided for receiving the output voltage signal 57a of the fuel cell current detector 57 and the set voltage Vs as the output signal of the setting means 66. The control means comprises the D.C. converter 53 for controlling the strength of the fuel cell current If with the set voltage Vs as a set value, and deviating amplifier 65.

Simultaneously referring to a waveform chart of FIG. 4 illustrating the waveforms in the principal portions, the operation of the fuel cell power supply of FIG. 3 will be described. If the load current $I_1$ up to time $t_1$ is zero, since it is so arranged that the voltage $V_1$ a of the detection signal 58a is lower than that of the first set signal Vr, the level of the output signal 60a of the comparator is set at L. In addition, the level of the output signal 62a of the signal generator is set at L, since the voltage $V_1$ b of the output signal 61a of the first amplifier is zero. Consequently the voltage $V_1$ c of the output signal 63a of the second amplifier is also zero. The strength of the set voltage Vs produced by the adder 64 is equal to that of the voltage Vr of the first set signal 59a without variation with time up to time $t_1$. Therefore, the strength of the fuel current If is made equal to that of the rated current Ir under the control of the control means 67. Since the load current $I_1$ is zero at that time, the current If is totally used for charging the secondary cell 52. Ib represents the current flowing through the secondary cell 52.

Assuming that the load current $I_1$ has a value $I_{1\ 1}$ greater than the above value Ir at time $t_1$ and the current value $I_{1\ 1}$ continuously changes in steps by a duration of $W_1$, since the above principal means are arranged so that the voltage $V_1 a_1$ of the detection signal 58a proportional to the load current $I_{1\ 1}$ may be greater than the voltage Vr of the first set signal 59a, the level of the output signal 60a of the comparator becomes H and the signal 61a having the voltage $V_1 b_1 = B.V_1 a_1$ is produced by the amplifier 61. When the signal 61a at the voltage $V_1 b_1$ is produced by the first amplifier 61, the level of the output signal of the time signal generator 62 remains at H during the time T obtained from the equation (1), i.e., $T_1 = K.(1/V_1 b_1)$. Since the output signal 61a of the first amplifier maintains the voltage $V_1 b_1$ with the duration $W_1$, the voltage signal 63a having the strength of $V_1 c_1 = C.V_1 b_1$ produced by the second amplifier during the time $T_1$. The strength of the set voltage Vs produced by the adder 64 with the duration $T_1$ from $t_1$ becomes $V_1 c_1 + Vr$, and accordingly the fuel cell current If has the strength of $If_1$, corresponding to the set voltage $V_1 c_1 + Vr$ with the duration $T_1$ from time $t_1$ to $t_2$. Since the above principal means are arranged so that the equation $If_1 = I_{1\ 1}$ may be satisfied, the current Ib in the secondary cell 52 is zero.

The state wherein the cell current If remains at $If_1$ continues up to time $t_2$, and the strength of the current If returns to Ir as the set voltage Vs returns to Vr after $t_2$. On the other hand, the load current $I_1$ with the duration $T_1$ from time $t_2$ to $t_3$ later than the time $t_2$ maintains the strength of $I_{1\ 1}$, and the current having the strength of $Ib = I_{1\ 1} - Ir$ is discharged from the secondary cell from the time $t_2$ to $t_3$.

If the load current $I_1$ has the value $I_{1\ 2}$, which is smaller than Ir of the rated current at time $t_3$, the level of the output signal of the comparator becomes L, the output signal 61a of the first amplifier becomes zero, and the fuel cell current If maintains the strength of Ir since the output signal 63a of the second amplifier remains at zero. The secondary cell 52 is charged with the current having the strength of $(Ir - I_{1\ 2})$ in that case since $I_{1\ 2} < Ir$. If the load current $I_1$ becomes zero at time $t_4$, the secondary cell is again charged with the current If having the strength of Ir, since the principal means are in the state prior to time $t_4$.

If the load current $I_1$ set at zero is suddenly changed so as to have the value $I_{1\ 3}$, which is greater than Ir and smaller than $I_{1\ 1}$, with the duration $W_3$ from time $t_5$ to $t_6$, the output signal 60a of the comparator is set at the level H and the signal 61a at the voltage $V_1 b_3$ is produced by the amplifier 61. As a result, the signal 62a at level H is produced by the signal generator 62 with the duration $T_3$ equivalent to $K/V_1 b_3$, and the signal 63a having the voltage $V_1 c_3$ equal to $C.V_1 b_3$ is produced by the amplifier 63. If the strength of the detection signal 58a is $V_1 a_3$, $V_1 a_3 = A.I_{1\ 3}$ and the voltage produced by the amplifier 61 is one expressed by $V_1 b_3 = B.V_1 a_3$. In FIG. 4, $W_3 = T_3$ is assumed by chance. Since $I_{1\ 3} < I_{1\ 1}$, $V_1 b_3 < V_1 b_1$, therefore $T_3 > T_1$. Since the set voltage Vs up to time $t_6$ becomes $(Vr + V_1 c_3)$, the fuel cell current If in this time zone has the value $If_3$, corresponding to the set voltage $(Vr + V_1 c_3)$. As the principal means are arranged so as to maintain $If_3 = I_{1\ 3}$, the secondary cell current Ib becomes zero from time $t_5$ to $t_6$. If the load current $I_1$ has the value $I_{1\ 4}$, which is smaller than Ir from $t_6$ up to $t_7$, the charging current $Ib = Ir - I_{1\ 4}$ flows to the secondary cell 52.

The power supply of FIG. 3 is thus operated and, if the overcurrent exceeding the rated current Ir of the fuel cell 52 flows through the load 55, an overcurrent of the same intensity is produced by the fuel cell 51 and supplied to the load 55. Accordingly, a fixed quantity of electricity for maintaining an overcurrent value is ultimately supplied by the fuel cell 51 to the load, because the output time of the overcurrent is limited to the time range T calculated by the equation (1). In the fuel cell power supply such as that shown in FIG. 3, the fuel cell 51 bears part of the overload when it is generated, and the capacity of the secondary cell can be made smaller than what is used in a conventional fuel power supply in which the secondary cell must bear the full overload. Thus, the secondary cell 52 in the fuel cell power supply according to the present invention can be made more compact.

The setting means for applying the set signal to the overcurrent control means according to the present invention is so arranged as to produce the first set signal without variation with time when the value of the output signal of the overcurrent detector does not exceed the fixed value. The second set signal whose strength is proportional to the value of the output signal is added to the first set signal only during the time corresponding to the value of the output signal when the output signal of the load current detector exceeds the fixed value to produce the combination of the signals. Thus, the fuel cell is forced to produce a fixed quantity of electricity by the control means in the state where the overcurrent is present when the load current exceeds the rated current and becomes the overcurrent. As a result of the present invention, the secondary cell may be designed to have a small capacity in comparison to cells used in a conventional fuel cell power supply, where the secondary cell must bear the full overcurrent.

As set forth above, the fuel cell is forced to produce a fixed quantity of electricity by the control means when the load current exceeds the rated current and becomes overcurrent, and consequently the capacity of the secondary cell may be made smaller than that of typical secondary cells used in a conventional fuel power supply where the secondary cell must bear the full overcurrent.

It is understood that various modifications and variations could be made in the invention without departing from the scope or spirit of the invention.

What is claimed is:

1. A fuel cell power supply including a fuel cell and a secondary cell for backing up the fuel cell, comprising: fuel cell current detecting means for detecting the fuel cell current generated by the fuel cell; load current detecting means for detecting a load current flowing through the load of the fuel cell power supply and for producing a load signal corresponding to the load current; setting means for producing a set signal corresponding to the strength and time variation pattern of the output signal of the load current detecting means; and control means for receiving the output signal of the fuel cell current detecting means and the set signal of the setting means and controlling the strength of the fuel cell current.

2. A fuel cell power supply as claimed in claim 1, wherein said setting means includes means for correlating the output signal of the load current detecting means to an intermittent overload current, and the control means includes means for converting the fuel cell current into overcurrent having a value greater than the rated output current of the fuel cell and a value corresponding to the interval of the intermittent overload current.

3. A fuel cell power supply including a fuel cell and a secondary cell for backing up the fuel cell, comprising: fuel cell current detecting means for detecting the fuel cell current generated by the fuel cell; load current detecting means for detecting a load current flowing through the load of the fuel cell power supply and for producing a detection signal corresponding to the load current; setting means for receiving the detection signal, said setting means for producing a first set signal free from variation with time when the value of the detection signal does not exceed a fixed value, and for producing the combination of the first set signal and a second set signal proportional to the value of the first detection signal and added to the first set signal for a period corresponding to the value of the first detection signal when the first detection signal exceeds the fixed value; and control means for receiving the output signal of the fuel cell current detecting means and the set signal of the setting means and for controlling the strength of the fuel cell current.

* * * * *